(12) United States Patent  (10) Patent No.: US 8,661,103 B2
Mehta et al.  (45) Date of Patent: Feb. 25, 2014

(54) BUSINESS APPLICATION ADDRESS DETERMINATION

(75) Inventors: Harish Mehta, Walldorf (DE); Jako Blagoev, Sofia (BG); Otto Boehrer, Wiesloch (DE); Thomas Kunz, Lobbach/Lobenfeld (DE); Alexander Zubev, Pazardzhik (BG)

(73) Assignee: SAP AG, Walldorf (DE)

( * ) Notice: Subject to any disclaimer, the term of this patent is extended or adjusted under 35 U.S.C. 154(b) by 70 days.

(21) Appl. No.: 12/338,603

(22) Filed: Dec. 18, 2008

(65) Prior Publication Data

US 2010/0161712 A1  Jun. 24, 2010

(51) Int. Cl.
  *G06F 15/173*  (2006.01)
  *G06F 15/16*  (2006.01)
  *G06F 3/00*  (2006.01)

(52) U.S. Cl.
  USPC ........................... 709/223; 709/230; 719/320

(58) Field of Classification Search
  None
  See application file for complete search history.

(56) References Cited

U.S. PATENT DOCUMENTS

| | | | | |
|---|---|---|---|---|
| 5,951,694 A | * | 9/1999 | Choquier et al. | 714/15 |
| 6,101,528 A | * | 8/2000 | Butt | 709/203 |
| 6,430,607 B1 | * | 8/2002 | Kavner | 709/217 |
| 6,453,362 B1 | * | 9/2002 | Bittinger et al. | 719/316 |
| 7,698,398 B1 | * | 4/2010 | Lai | 709/223 |
| 2005/0188318 A1 | * | 8/2005 | Tamir et al. | 715/744 |
| 2007/0061434 A1 | * | 3/2007 | Schmieder et al. | 709/223 |
| 2008/0177872 A1 | * | 7/2008 | Vengroff | 709/223 |
| 2009/0193096 A1 | * | 7/2009 | Boyer et al. | 709/217 |

* cited by examiner

*Primary Examiner* — Wen-Tai Lin
(74) *Attorney, Agent, or Firm* — Brake Hughes Bellermann LLP

(57) ABSTRACT

According to one general aspect, a method may comprise identifying a provider application that is associated with a consumer application, from amongst a plurality of provider applications hosted on a provider machine. In various embodiments, the identification may be based at least in part upon the provider application's business identifier (ID). In various embodiments, each provider application includes at least one web service. In some embodiments, the plurality of provider applications includes a plurality of instantiations of at least one of the web service. In various embodiments, the method may also include transmitting a message to one of the web services of the identified provider application.

17 Claims, 9 Drawing Sheets

702 Associating the consumer application with a plurality of provider applications, wherein each provider application is configured to provide a business application 704 Selecting a business application with which to communicate 706 Identifying a provider application that is associated with a consumer application, from amongst a plurality of provider applications hosted on a provider machine 708 Transmitting a message to one of the web services of the identified provider application 710 Transmitting an unsolicited message to a provider application, wherein the unsolicited message includes the business application ID of the consumer application

800

BUSINESS APPLICATION ADDRESS DETERMINATION

TECHNICAL FIELD

This description relates to network communication, specifically to network communication between multiple business applications.

BACKGROUND

Traditionally, large infrastructure level software applications have been locally installed and executed on a customer's computing machine, either as a stand-alone application or as an internal client-server system. Alternatively, a customer may purchase a mainframe or multi-headed system in which the application is executed by a single centralized machine and multiple users may access the machine via a plurality of individual keyboards and screens (colloquially referred to as "heads").

Software as a service (SAAS) is a model of software deployment where an application is hosted, in whole or part, as a service provided to customers across a network (e.g., the Internet, etc.). By eliminating the need to install and run the entire application on the customer's own computer, SAAS often alleviates the customer's burden of software maintenance, ongoing operation, and support. Conversely, customers often relinquish control over the software. Also, using SAAS can typically reduce the up-front expense of software purchases, through less costly, often on-demand pricing. From the software vendor's standpoint, SAAS has the attraction of providing stronger protection of its intellectual property, establishing an ongoing revenue stream, and attracting customers who might traditionally be priced out of the market. In general, a SAAS software vendor may host the application on its own server, or this function may be handled by a third-party application service provider (ASP).

Enterprise resource planning (ERP) is typically the planning of how business resources (e.g., inventory, employees, customers, etc.) are acquired and flow through the business process associated with each resource. Frequently, ERP includes the capture, storage and analysis of information relating to the tracked resources. In various cases ERP may be divided into sub-categories or systems pertaining to financials, human capital management, materials management, customer relationship management, sales & distribution, and production planning, corporate services, and/or general operations management. In general, a well executed ERP system enhances productivity and provides insight to a business. Often an ERP customer may wish to keep their ERP data secret from their competitors and more generally the world.

Customer relationship management (CRM) is typically the practice of intelligently finding, marketing to, selling to, and servicing customers. Frequently, CRM includes the capture, storage, and analysis of information relating to customers, vendors, partners, and/or internal systems. Often a customer may wish to keep their customer relationship management data secret from their competitors and more generally the world.

SUMMARY

According to one general aspect, a method may comprise identifying a provider application that is associated with a consumer application, from amongst a plurality of provider applications hosted on a provider machine. In various embodiments, the identification may be based at least in part upon the provider application's business identifier (ID). In various embodiments, each provider application includes at least one web service. In some embodiments, the plurality of provider applications includes a plurality of instantiations of at least one of the web service. In various embodiments, the method may also include transmitting a message to one of the web services of the identified provider application.

According to another general aspect, an apparatus may include business logic functions and at least one consumer communication proxy. In various embodiments, the business logic functions may be configured to perform logical operations on business data. In some embodiments, the consumer communication proxy may be configured to identify a provider application that is associated with the apparatus, from amongst a plurality of provider applications hosted on a provider machine. In various embodiments, the identification may be based at least in part upon the provider application's business identifier (ID). In various embodiments, each provider application includes at least one web service. In one embodiment, the plurality of provider applications includes a plurality of instantiations of at least one of the web service. In some embodiments, the consumer communication proxy may be configured to transmit a message to one of the web services of the identified provider application.

According to another general aspect, a method may include receiving, by a web service, a message, from a consumer application, that includes a business application identifier that substantially uniquely identifies the consumer application. In some embodiments, the method may include determining, based upon the business application ID, a logical port address with which to communicate with at least a portion of the consumer application. In one embodiment, the method may include transmitting, via a communication proxy, a response message to the consumer application via the determined logical port address.

According to another general aspect, an apparatus may include business logic functions, at least one web service, and at least one communications proxy. In various embodiments, the business logic functions may be configured to perform logical operations on business data. In some embodiments, the web service may be configured to receive a message, from a consumer application, that includes a business application identifier that substantially uniquely identifies the consumer application. In one embodiment, the communications proxy may be configured to determine, based upon the business application ID, a logical port address with which to communicate with at least a portion of the consumer application. In some embodiments, the communications proxy may be configured to transmit a response message to the consumer application via the determined logical port address.

According to another general aspect, a computer program product, may comprise a computer usable medium having a computer readable program code embodied therein. In some embodiments, the computer readable program code may be adapted to be executed to implement a method for the determining a logical port address. In one embodiment, the method may include identifying a provider application that is associated with a consumer application, from amongst a plurality of provider applications hosted on a provider machine. In various embodiments, the identification may be based at least in part upon the provider application's business identifier (ID). In some embodiments, each provider application includes at least one web service. In one embodiment, the plurality of provider applications includes a plurality of instantiations of at least one of the web service. In various embodiments, the method may include transmitting a message to one of the web services of the identified provider application.

According to another general aspect, a computer program product, may comprise a computer usable medium having a computer readable program code embodied therein. In some embodiments, the computer readable program code may be adapted to be executed to implement a method for the determining a logical port address. In one embodiment, the method may include receiving, by a web service, a message, from a consumer application, that includes a business application identifier that substantially uniquely identifies the consumer application. In various embodiments, the method may include determining, based upon the business application ID, a logical port address with which to communicate with at least a portion of the consumer application. In one embodiment, the method may include transmitting, by a communications proxy, a response message to the consumer application via the determined logical port address.

According to another general aspect, a consumer application may include at least one communications proxy configured to communicate with a web service included by a provider application. In some embodiments, the consumer application may also include an application programmable interface (API). In one embodiment, the API may include a logical port address determination procedure configured to take as input a value communication representing a communications proxy and a value respecting a substantially unique identifier of a business application, and provide a logical port address with which the communications proxy can communicate with the business application. In some embodiments, the API may be include a business application identifier determination procedure configured to provide a substantially unique identifier of the consumer application.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

BRIEF DESCRIPTION OF THE DRAWINGS

FIG. 7 is a flowchart of an example embodiment of a technique in accordance with the disclosed subject matter.

Like reference symbols in the various drawings indicate like elements.

DETAILED DESCRIPTION

Figure 2:
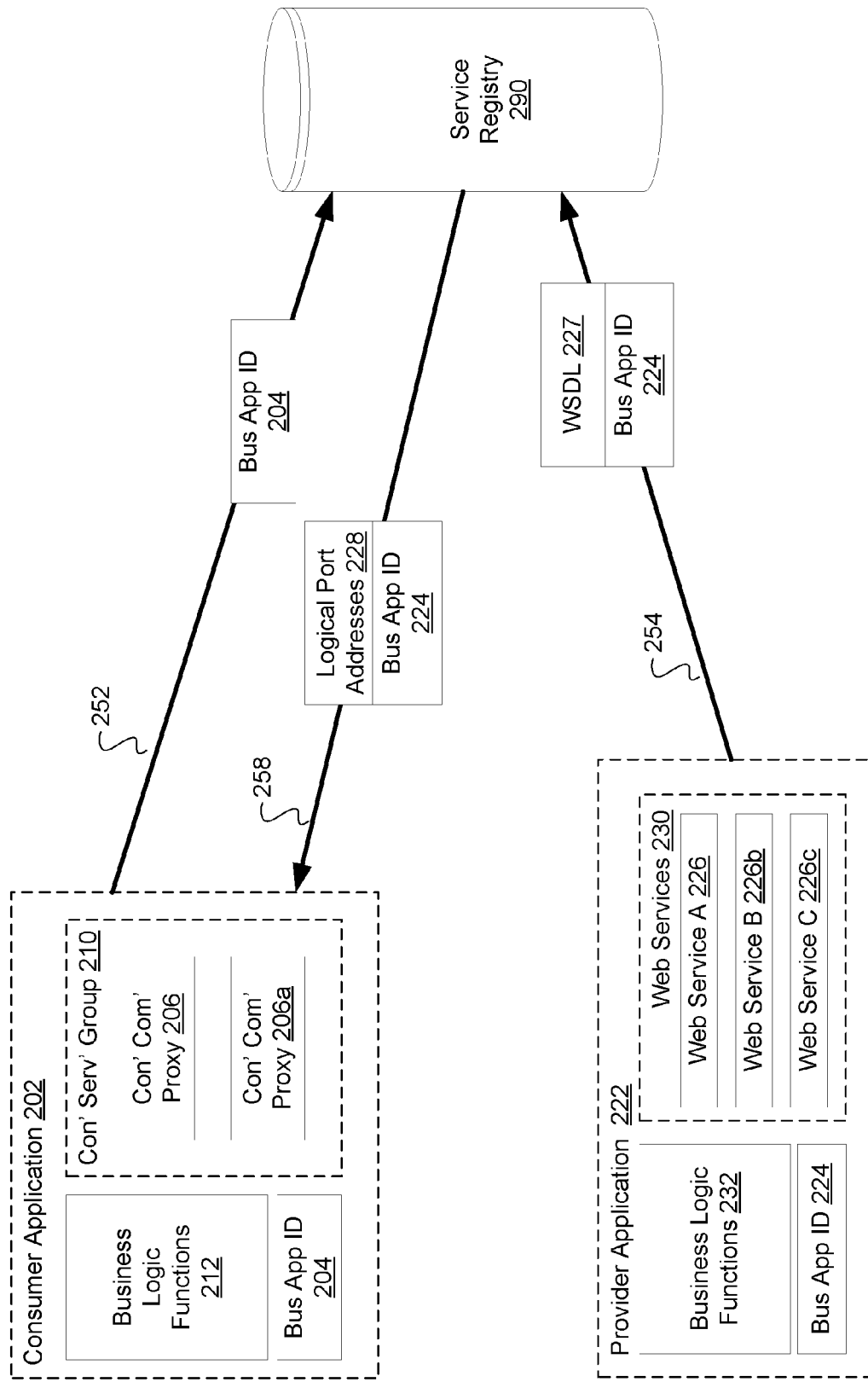
FIG. 2 is a block diagram of an example embodiment of a system in accordance with the disclosed subject matter.

FIG. 2 is a block diagram of an example embodiment of a system in accordance with the disclosed subject matter. In one embodiment, the system 200 may include a consumer application 202, a provider application 222, and a service registry 290. In some embodiments, the system 200 may illustrate a period of time referred to as "configuration time", in which the consumer application 202 or the provider application 222 are configured and established as part of the system 200. In various embodiments, this may occur as one of the systems is started or rebooted, for example.

In this context, a "consumer application" may be any application (e.g., software, firmware, hardware, etc.) that makes use of a provider application (e.g., a provider application 222). In various embodiments, the consumer application may in turn provide services (e.g., business logic or processing, storage, etc.) to another application, and/or may not be used by an end-customer.

In this context, a "provider application" may be any application (e.g., software, firmware, hardware, etc.) that provides a service (e.g., business logic, storage, etc.) to a consumer application (e.g., a consumer application 202). In various embodiments, the provider application may, in turn, consume or make use of a service provided by another application or service.

In this context, the term "business application" may refer to either a consumer application (e.g., consumer application 202) or a provider application (e.g., provider application 222). In such an embodiment, a business application may perform a business function (e.g., a portion of CRM, inventory management, sales management, ERP, etc.) in which a service provided by another is consumed, or a service is provided to another who consumes the product of the service.

In one embodiment, the consumer application 202 may include a set of business logic functions 212, a plurality of consumer communication proxies (CCPs) (e.g., CCPs 206 and 206a), and a business application identifier (ID) 204. In various embodiments, the business application ID 204 may be configured to substantially uniquely identify the consumer application 202, at least within the system 200. This may be contrasted with a business application name (e.g., "CRM v1.2", etc.) which may be a human readable descriptor of the business application but may be repeated several times within a system if the business application is instantiated multiple times (e.g., a system like that illustrated in FIG. 4, etc.).

In one embodiment, the consumer application 202 may include various business logic functions 212. In some embodiments, these business logic functions 212 may include the logic to perform a set of business operations (e.g., CRM tasks, ERP tasks, user interface tasks, etc.); although, it is understood that the above are merely a few illustrative examples to which the disclosed subject matter is not limited.

In one embodiment, the consumer application 202 may include a plurality of consumer communication proxies 206. In various embodiments, these CCPs 206 may be configured to convert a message from a first format or protocol to a second format or protocol. In some embodiments, a CCP 206 may include a input/output interface configured to convert data or a message from an internal format used by the business logic functions 212 to an external format or protocol usable by a network or a web service (e.g., web service A 226, etc.), and vice versa. Examples of external formats or protocols may include remote procedure calls (RPCs), extensible markup language (XML) formatted messages, Simple Object Access Protocol (SOAP), etc.; Although, it is understood that the above are merely a few illustrative examples to which the disclosed subject matter is not limited.

In some embodiments, at least a portion of the plurality of CCPs may be grouped into a consumer service group (CSG) 210. In various embodiments, a consumer service group 210 may provide a convenient entity that may be associated with other objects (e.g., business applications IDs, etc.).

In various embodiments, the provider application 222 may include business logic functions 232, a plurality of web services 230, and its own business application ID 224. In such an embodiment, the business application ID 224 may substantially uniquely identify the provider application 222.

In various embodiments, the plurality of web services 230 (e.g., web services 226, 226b, and 226c, etc.) may be configured to provide an interface for a service or logical function offered and substantially performed by the provider application 222. In various embodiments, a web service 226 may perform a relatively minimal task (e.g., adding a customer to a database, converting currency values, retrieving an item or record from a database, etc.). As such, in various embodiments, a provider application 222 may include a large number of web services 226. In such an embodiment, a web service 226 may be thought to be more analogous to an individual function or method than to an all-encompassing service. Such an encompassing service may be the sum of the individual web services 206 and be provided by the provider application 222. Although, it is understood that the above is merely one illustrative example to which the disclosed subject matter is not limited.

In various embodiments, the Service Registry (SR) 290 may include an open standard based registry for web services. In some embodiments, the service registry 290 may be located centrally within an Enterprise Service Architecture (ESA) landscape. In such an embodiment, the service registry 290 may contain or include entries for all services and service definitions in that landscape, with references to the services' relevant metadata and to the locations of the callable service endpoints. In various embodiments, the registered services may be classified using a semantic-rich classification system (e.g., Business Application ID) to enable browsing of services by classification.

In various embodiments, the provider application 222 or the web service 226 may transmit a message 254 to the service registry 290. In such an embodiment, the web service 226 or provider application 222 may register itself within the service registry 290. In some embodiments, the message 254 may include the business application ID 224 and one or more web services description language (WSDL) message 227. In various embodiments, the WSDL message 227 or an equivalent may describe and define the web service 226. In various embodiments, WSDL message 227 may include an interface and network address description for the web service 226 from which a logical port address (e.g., logical port address 228) may be derived. In some embodiments, the WSDL message 227 may directly include the logical port address of the web service 226. In various embodiments, the WDSL message 227 may include WDSL messages for a plurality of web services (e.g., web services 226, 226b, and 226c).

In some embodiments, the service registry 290 may be configured to match or associate two or more business applications, such that the business applications may communicate. In various embodiments, the service registry 290 may match or associate consumer applications (e.g., consumer application 202) with one or more provider applications (e.g., provider application 222). In some embodiments, this association may be dynamic or statically configured. For example, the consumer application 202 may deal with inventory management, specifically the front-end or user interface, and need a service to provide back-end functions. The provider application 222 may provide services (e.g., database storage, logical business rules, inventory tracking, quality handling, etc.) that are useful to inventory management. In some embodiments, the service registry 290 or an administrator thereof may associate the two business applications.

In various embodiments, the consumer application 202 may transmit its business application ID 204 to a service registry 290 via a message 252. In some embodiments, the service registry 290 may be configured to facilitate the configuration of business applications (e.g., consumer application 202, provider application 222, etc.) within a system (e.g., system 200). In various embodiments, the message 252 may be viewed as or include a request message, in which the consumer application 202 requests identification of the provider applications with which it is associated.

In such an embodiment, the service registry 290 may transmit the business application ID 224 of the provider application 222 and its logical port addresses 228 to the consumer application 202 via the message 258. In various embodiments, the logical port addresses 228 may be derived or extracted from the WDSL message 227, supplied by the provider application 222.

In various embodiments, each web service 226 may include or be associated with a logical port address. In various embodiments, the logical port address may store the host name and port number where the web service 226 may be reached on the network. In such an embodiment, the logical port address may include a universal resource locator (URL) or universal resource identifier (URI), for example; although, it is understood that the above are merely a few illustrative examples to which the disclosed subject matter is not limited. In some embodiments, the logical port address may also include the security settings (e.g., protocol, username, password, etc.) used to communicate with the web service 226. In various embodiments, the logical port address may be automatically generated by the web service 226 or the provider application 222.

In various embodiments, once the consumer application 202 is are aware of the provider application 222, for example via the service registry 290 message 258, communication and interaction between the two business applications may begin. In one embodiment, communication may begin once one of the business applications (e.g., the consumer application 202) asynchronously communicates with the other (e.g., provider application 222), as described below in reference to FIG. 5.

In various embodiments (not illustrated), the service registry 290 may be configured to assign a business application ID to a business application, as opposed to the business application generating or being manually configured with the business application ID.

Figure 3:
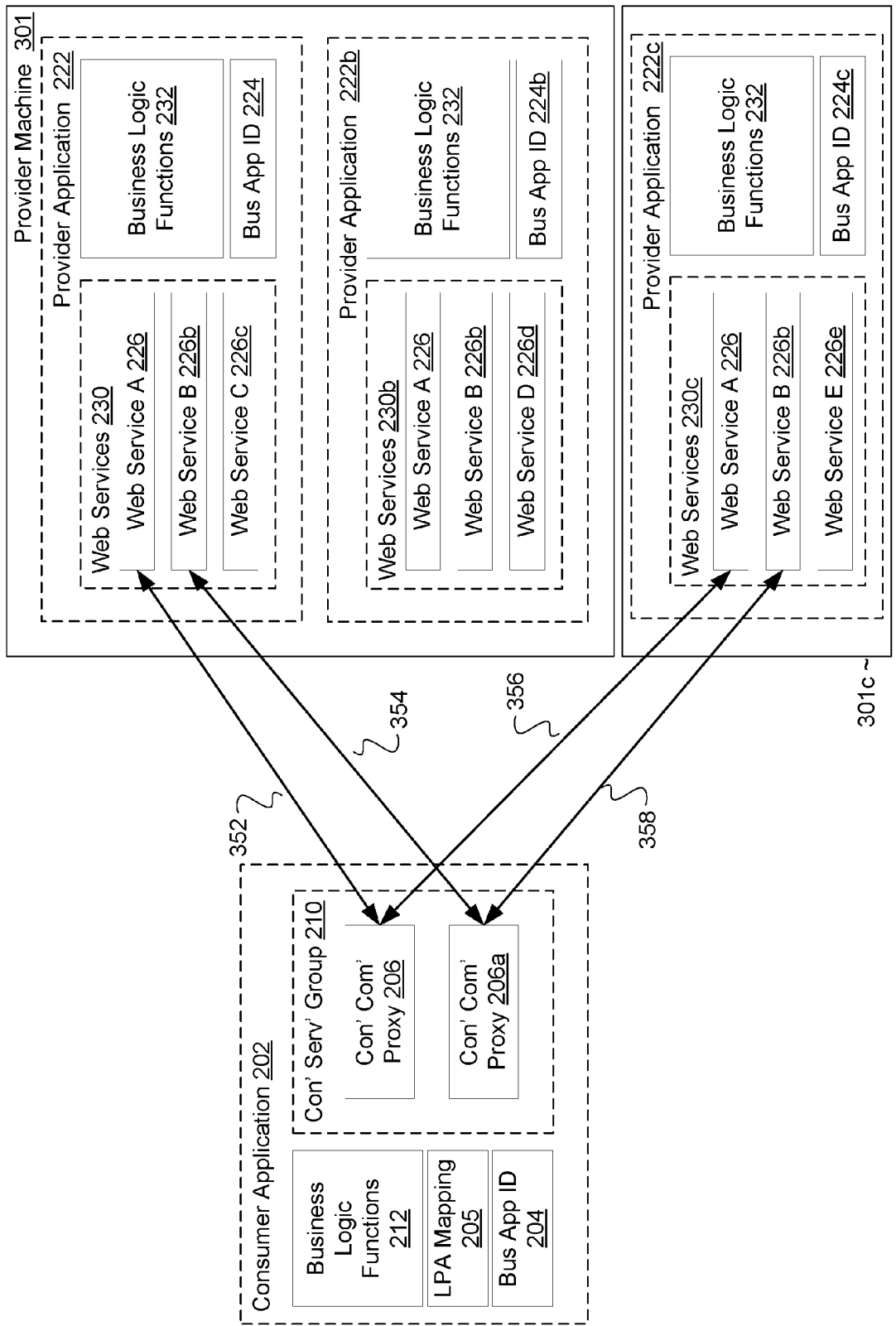
FIG. 3 is a block diagram of an example embodiment of a system in accordance with the disclosed subject matter.

FIG. 3 is a block diagram of an example embodiment of a system 300 in accordance with the disclosed subject matter. In various embodiments, the system 300 may include a consumer application 202, and a plurality of provider applications (e.g., provider applications 222, 222b, and 222c). In one embodiment, each of the provider applications may provide different business services or applications (e.g., CRM, ERP, Supplier Relationship Management (SRM), Product Lifecycle Management (PLM), Supply Chain Management (SCM), etc.). In such an embodiment, the consumer application 202 may desire or need to interact or communicate with two of the three provider applications (e.g., provider application 222 and 222c). In an illustrative example, the consumer application 202 may provide an inventory management front-end and may use SCM back-end services provided by provider application 222 and SRM back-end services provided by provider application 222c; although, it is understood that the above is merely one illustrative example to which the disclosed subject matter is not limited.

In one embodiment, the provider applications 222 and 222b may be executed or included by a single provider machine 301. In various embodiments, the provider machine 301 may include a plurality of machines operating with a common interface (e.g., a load-balanced group of servers, etc.). In such an embodiment, the provider applications 222 and 222b may instantiate a plurality of copies of substantially identical web services (e.g. web service A 226 and web service B 226b).

In such an embodiment, multiple provider applications may overlap in their functionality (e.g., both may include the service "add entry to database", etc.). The duplicated web services may include the same software, firmware, or hardware, in various embodiments. In various embodiments, the duplicated or multiply instantiated web services may include the same web service name or identifier, port number, etc.

In such an embodiment, it may be very difficult for a consumer application 202 to determine whether it should be communicating with the web service B 226b of provider application 222 or the web service B 226b of provider application 222b. If the wrong web service is chosen by the consumer application 202 a transmitted messaged may be ignored, or worse. For example, if the consumer application 202 believed it was transmitting a SCM message to provider application 222, but instead the consumer application 202 had transmitted the SCM message to web service B 226b of PLM provider application 222b, the message would fail, the data included may never be entered, or the function requested may never be performed, etc. Although, it is understood that the above is merely one illustrative example to which the disclosed subject matter is not limited.

Therefore, it is often necessary to select not only the correct web service to communicate with but the correct provider application too. In various embodiments, this may include selecting from multiple provider applications hosted on different machines (e.g., provider machines 301 and 301c). In such an embodiment, the selection process may be less difficult as the two machines 301 and 301c may include different host names, domain names, network addresses (e.g., Internet protocol (IP) addresses), etc., as opposed to the case involving multiple provider applications 222 and 222b on the same machine 301 (and may therefore, for example, have the same host names, domain names, network addresses, etc.).

In one embodiment, the consumer application 202 may be configured to identifying a provider application 222 that is associated with a consumer application 202 from amongst a plurality of provider applications 222 and 222b hosted on a provider machine 301. In various embodiments, identifying may include using a business application ID associated with the provider application 222 (e.g., business application ID 224). In some embodiments, the provider application's 222 business application ID 224 may have been received by the consumer application 202 by a service registry, as described above. In another embodiment, the business application ID 224 may have been received as part of a message from the provider application 222, as described below in reference to FIG. 5.

In various embodiments, the consumer application 202 may have grouped a plurality of CCPs 206 and 206a into a consumer service group 210. In one embodiment, these may be the CCPs 206 that interact with a specific business application (e.g., one handling SCM). In various embodiments, a CCP 206 may belong to or be included by multiple CSGs 210 (e.g., if the CCP 206 dealt with both SCM and SRM functions). In the illustrated embodiment, the CSG 210 may be associated with the business application ID 224 of a provider application 222.

In one embodiment, the consumer application 202 or portion thereof, may use the business application ID 224 to determine the logical port address of a particular web service (e.g., web service A 226, web service B 226b, web service C 226c). In various embodiments, the consumer application 202 may maintain a list or mapping 205 that associates business applications IDs with web services and the web services' logical port addresses. In such an embodiment, the CCP 206 or other portion of the consumer application 202 (e.g., business logic functions 212) may query the mapping or portion of the consumer application 202 (e.g., logical port address (LPA) mapping 205) with the business application ID (e.g., business application ID 224) and the desired web service (e.g., web service A 226) and be provided with web service A's 226 LPA.

In one embodiment, the consumer application 202 may be associated with a plurality of provider applications (e.g., provider applications 222 and 222c). In various embodiments, the business logic function 212 may determine a particular type of business application to transmit a message to (e.g., a SRM business application, a SCM business application, etc.). The consumer application 202 may determine which of the associated provider applications provides the desired business application (e.g., provider application 222 for SRM, provider application 222c for SCM, etc.). In one embodiment, once the provider application is determined the provider application's business application ID may be used to determine the logical port address.

In another possibly more preferred embodiment, the order of determination may be reversed. Once the desired business application is selected (e.g., SRM), the consumer application 202 may determine the business application ID for the business application that provides that service. In such an embodiment, the business application ID (e.g., business application ID 224) may be compared with the associated provider applications to determine the appropriate provider application identified (e.g., provider application 222). In such an embodiment, a list or array of web services provided by the selected provider application may be determined, and a particular web service (e.g., web service A 226) may be selected. The logical port address of the selected web service may be retrieved (e.g., from the LPA mapping 205).

Once the web service's LPA (e.g., web service A's 226 LPA) has been determined, the CCP 206 may transmit a message 352 to the desired web service (e.g., web service A 226) of the identified provider application 222. Message 356 illustrates that the same process may be repeated or performed in regards to web service A 226 of provider application 222c if, for example, if a SCM message is sent to provider application 222c. Messages 354 and 356 illustrate that the same or an analogous process may occur for communication between other CCPs and web services (e.g., the CCP 206a and the web service B 226b). In various embodiments, the communication or a portion thereof may be asynchronous or unsolicited. In another embodiment, the communication or a portion thereof may be synchronized or part of a series of messages (e.g., request, response, acknowledgement, etc.).

Figure 4:
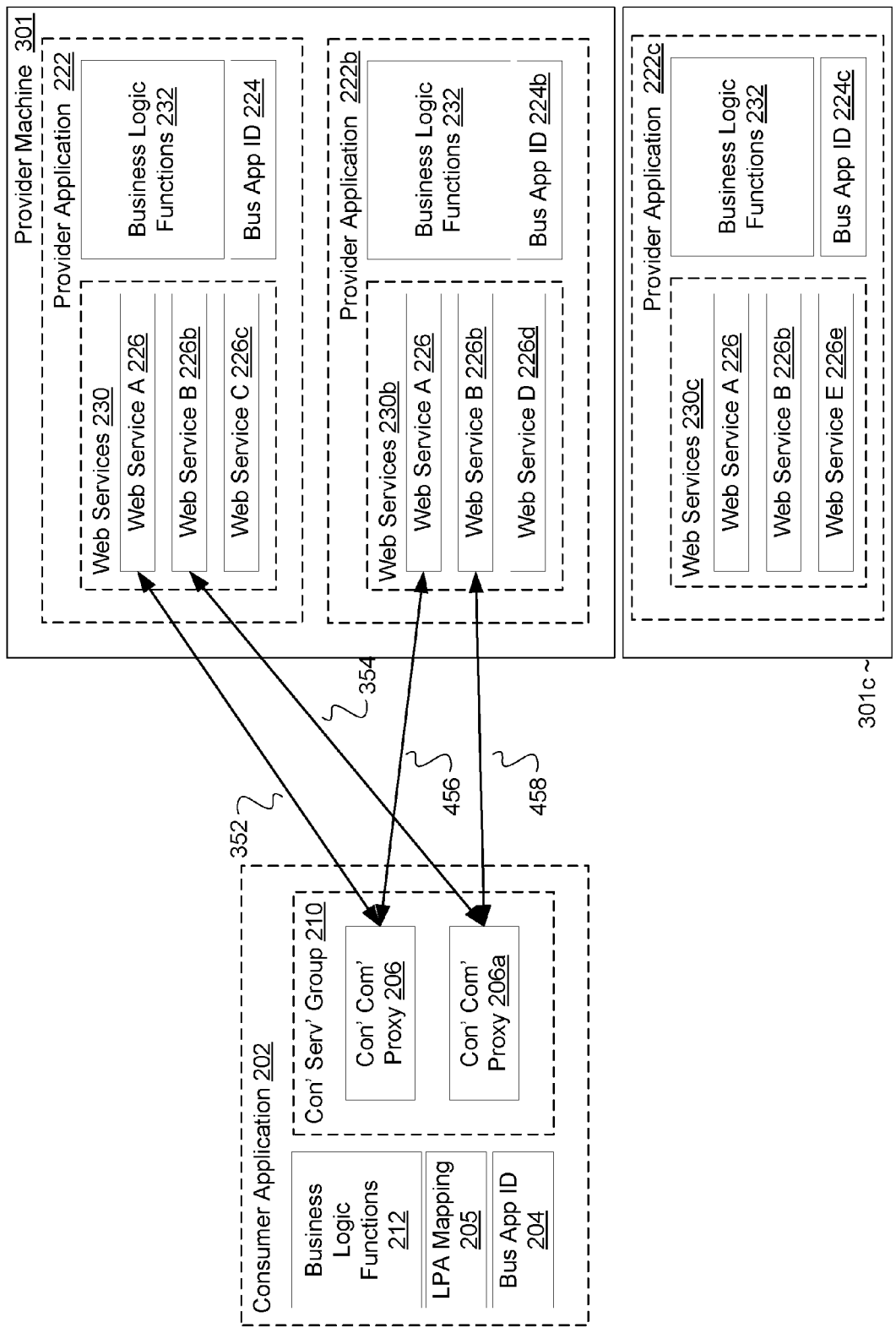
FIG. 4 is a block diagram of an example embodiment of a system in accordance with the disclosed subject matter.

FIG. 4 is a block diagram of an example embodiment of a system 400 in accordance with the disclosed subject matter. In one embodiment, the system 400 may include the consumer application 202, and a plurality of provider applications 222, 222b, and 222c. System 400 illustrates that, in various embodiments, the consumer application 202 may communicate with different provider applications 222 and 222b included within a single provider machine 301 (e.g., as opposed to system 300 of FIG. 3, which illustrated communication with different provider machines 301 and 301c).

Messages 456 and 458 illustrate that, in various embodiments, the consumer application 202 may communicate with two or more provider applications (e.g., provider applications 222 and 222b) within a single provider machine or system 301. Returning to the specific example embodiment used above, provider application 222 may provide SCM services and provider application 222b may provide PLM services. In various embodiments, they may instantiate or copy the same web services (e.g., web service A 226 and web service B 226b), and include non-overlapping services (e.g., web service C 226c and web service D 226d).

In such an embodiment, it may be very difficult for the consumer application 202 to tell the multiply instantiated web services (e.g., web service A 226 and web service B 226b) apart as they share many networking characteristics (e.g., host name, domain name, port, etc.) as a function of being included by the provider machine 301. In one embodiment, the consumer application 202 may make use of the different business application IDs (e.g., business application IDs 224 and 224b), to differentiate the web services of the two provider applications 222 and 222b. As described above, in various embodiments, these business application IDs may be used to determine the different logical port addresses of the web services (e.g., web service A 226 of provider application 222, and web service A 226 of provider application 222b).

It is understood that the above systems 300 and 400 are merely a few illustrative examples to which the disclosed subject matter is not limited. In various embodiments, a consumer application 202 may communicate with any number of provider applications co-located or physically separated.

In various embodiments, the messages illustrated by FIGS. 3 and 4 may include messages in addition to the usual business application messages. In such an embodiment, the illustrated messages may provide an additional communication infrastructure for their respective systems.

Figure 5:
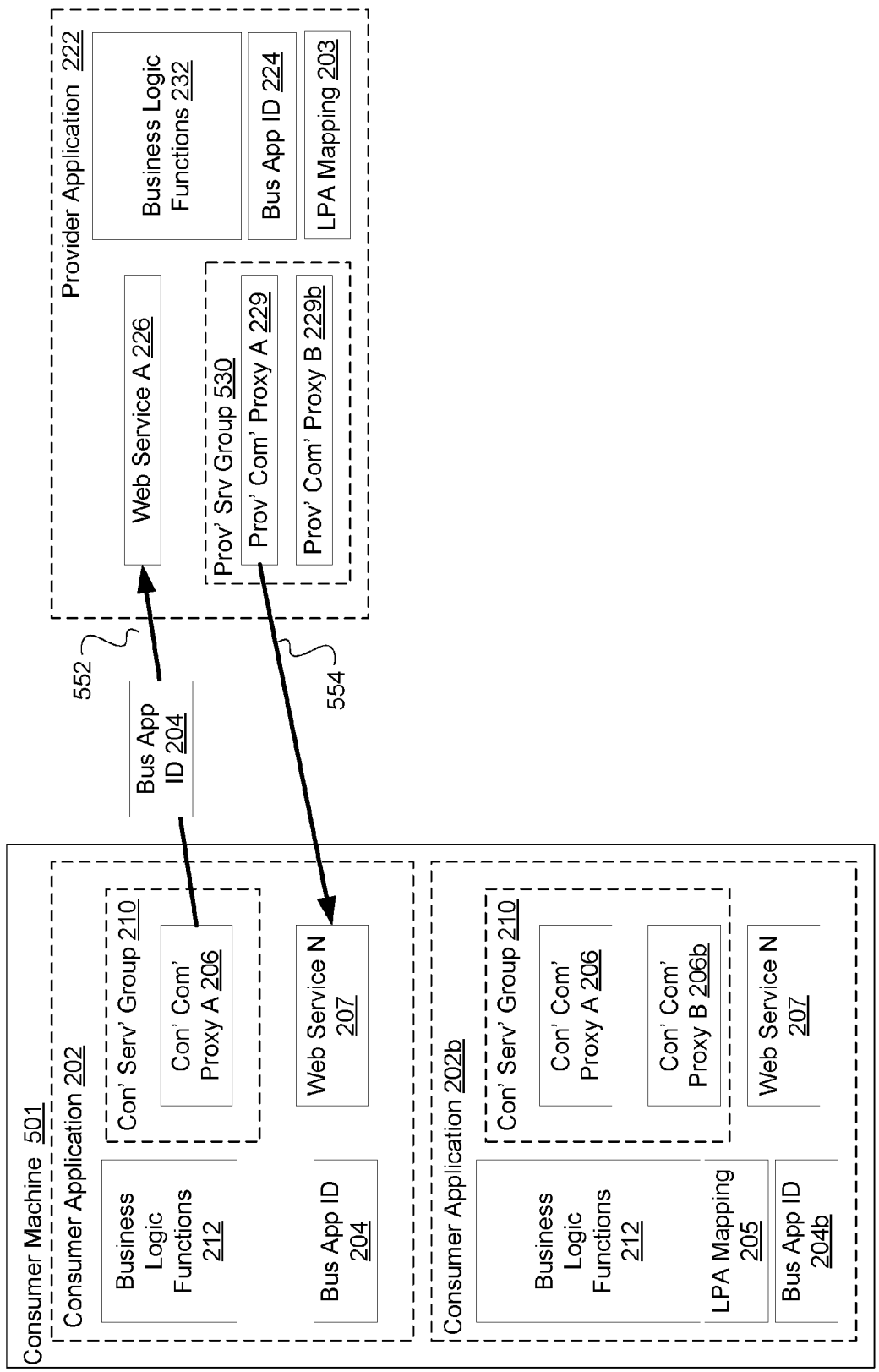
FIG. 5 is a block diagram of an example embodiment of a system in accordance with the disclosed subject matter.

FIG. 5 is a block diagram of an example embodiment of a system 500 in accordance with the disclosed subject matter. In various embodiments, the method of communication illustrated by FIG. 5 may be a secondary or alternate form of communication from that illustrated by FIGS. 3 and 4. In such an embodiment, the communication may be asynchronous or unsolicited communication.

In one embodiment, the system 500 may include a plurality of consumer applications (e.g., consumer applications 202 and 202b), and at least one provider application (e.g., provider application 222). In various embodiments, the consumer applications 202 and 202b may be included by a single consumer machine or entity 501.

In some embodiments, there may be multiple consumer applications 202 and 202b installed on a single consumer system 501 implementing or instantiating some of the same interfaces (e.g., consumer web service N 207, CCP 206, etc.). As previously mentioned in reference to FIGS. 3 and 4, one might try to differentiate these implementations with the help of the Business Application ID which may be a substantially globally unique ID (GUID). In various embodiments, the business application ID may be transferred in the payload of a message and may be used by the provider application to identify the transmitting consumer application. In such embodiments, an identification framework or application programming interface (API) may be used by the provider application to send messages back to the consumer application asynchronously decoupled from the request received by the consumer application.

In various embodiments, this concept may be used not only between two business applications within one homogeneous system but also with third party components or business applications. In some embodiments, Business Application ID may be used to identify an interface implementation uniquely and may be protocol independent. In one embodiment, it may be immaterial whether the communication occurs via any predefined or embodiment limiting protocol (e.g., SAP AG's NetWeaver, standards, web services (WS) standards, exchange infrastructure (XI), Intermediate Documents (IDOC), etc.); although, it is understood that the above are merely a few illustrative examples to which the disclosed subject matter is not limited.

In various embodiments, the consumer application 202 may transmit an unsolicited or asynchronous message 552 to the provider application 222. In such an embodiment, it may be difficult or cumbersome, using conventional techniques, for the provider application 222 to determine which consumer application 202 or 202b transmitted the message 552. For example, in one embodiment, as both consumer applications 202 and 202b are included by the same consumer machine 501, messages from both may include the same source networking information (e.g., network address, host name, domain name, etc.). Therefore, the provider application 222 may not be able to or may find it difficult to determine from the header of the message 552 whence it came.

In some embodiments, the message 552 may include the business application ID 204 of the transmitting consumer application 202. In various embodiments, the business application ID 204 may be included as a portion or part of the payload or data portion of the message 552.

In various embodiments, the message 552 may include a request or instruction that requires a response. Furthermore, in one embodiment, the message 552 may include an instruction or request that may that a long period of time to complete, such that a relatively immediate response is not expected. In such an embodiment, the consumer application 202 may not halt or block other operations while awaiting the response to message 552. In such an embodiment, the provider application 222 may provide the response message 554 asynchronously whenever the request of message 552 is ready to be fulfilled. Although, it is understood that the above is merely one illustrative example to which the disclosed subject matter is not limited.

In such an embodiment, the provider application 222 or receiving web service 226 may use the received business application ID 204 to determine the logical port address of a consumer web service N 207 of consumer application 202 to which a response message 554 should be returned. In various embodiments, the provider application 222 or provider communication proxy A 229 may identify the web service N's 207 logical port address in much the same way as the CCP determined the provider's web service's LPA, as described above in reference to FIG. 3.

Note, in various embodiments, both the consumer application 202 and the provider application 222 may include both web services (e.g., consumer web service N 207, provider web service A 226, etc.) and communication proxies (e.g., CCP 206, provider communication proxy (PCP) 229, etc.). It is also understood that the prefix's "consumer" and "provider" attached to web service and communication ports may, in various embodiments, be merely illustrative and used in aid of the explanation of the disclosed subject matter. As described above, in various embodiments, and consumer application may in some circumstances act as a provider application and vice versa. In various embodiments, the CCPs and PCP, for example, may be implemented or derived from a generic or reference communication proxy; likewise, with the web services.

In such an embodiment, the PCP 229 or provider application 222 may maintain a mapping 203 of business application IDs to LPAs, as described above. In one embodiment, the PCP 229 may match the received business application ID 204 to a set of mapped web services (e.g., web service N 207 of consumer application 202). From this list of web services an appropriate web service N 207 may be found and the web service N's 207 LPA may be determined.

In various embodiments, the provider application 222 may group the communication proxies 229 and 229b into a provider service group 530. In one embodiment, this provider service group 530 may be used analogously to the consumer service group, as described above. In such an embodiment, a function or procedure may take the received business application ID 204, the provider service group 530, and the transmitting PCP 229 as arguments or parameters and return the LPA of the desired web service 207, as described above.

In various embodiments, the provider application 222 may return or respond to the received message 552, with a response message 554. As described above, in some embodiments, this message 554 may be transmitted asynchronously as the message 554 is available for transmission, as opposed to part of synchronized procedure; although, it is understood that the above is merely one illustrative example to which the disclosed subject matter is not limited.

In various embodiments, as illustrated by FIG. 5, a provider application 222 may be thought of as acting as or analogous to a consumer application 202. In such an embodiment, the provider application 222 makes use of the business application ID 204 to determine a logical port address of a portion (e.g., a web service) of another business application (e.g., consumer application 202 vs. a provider application) that it wishes to communicate with. In some embodiments, an analogous process may be employed for consumer application-to-consumer application or provider application-to-provider application communication.

It is understood that while the illustrated embodiments show only one a particular type of business application (e.g., one consumer application 202 in FIGS. 3 and 4, and one provider application 222 in FIG. 5) that embodiments may exist that include a plurality of both consumer and provider applications and that their communication patterns may become quite complex and are within the scope of the disclosed subject matter.

In various embodiments, the messages illustrated by FIG. 5 may include messages in addition to the usual business application messages. In such an embodiment, the illustrated messages may provide an additional communication infrastructure for their respective systems.

Figure 6:
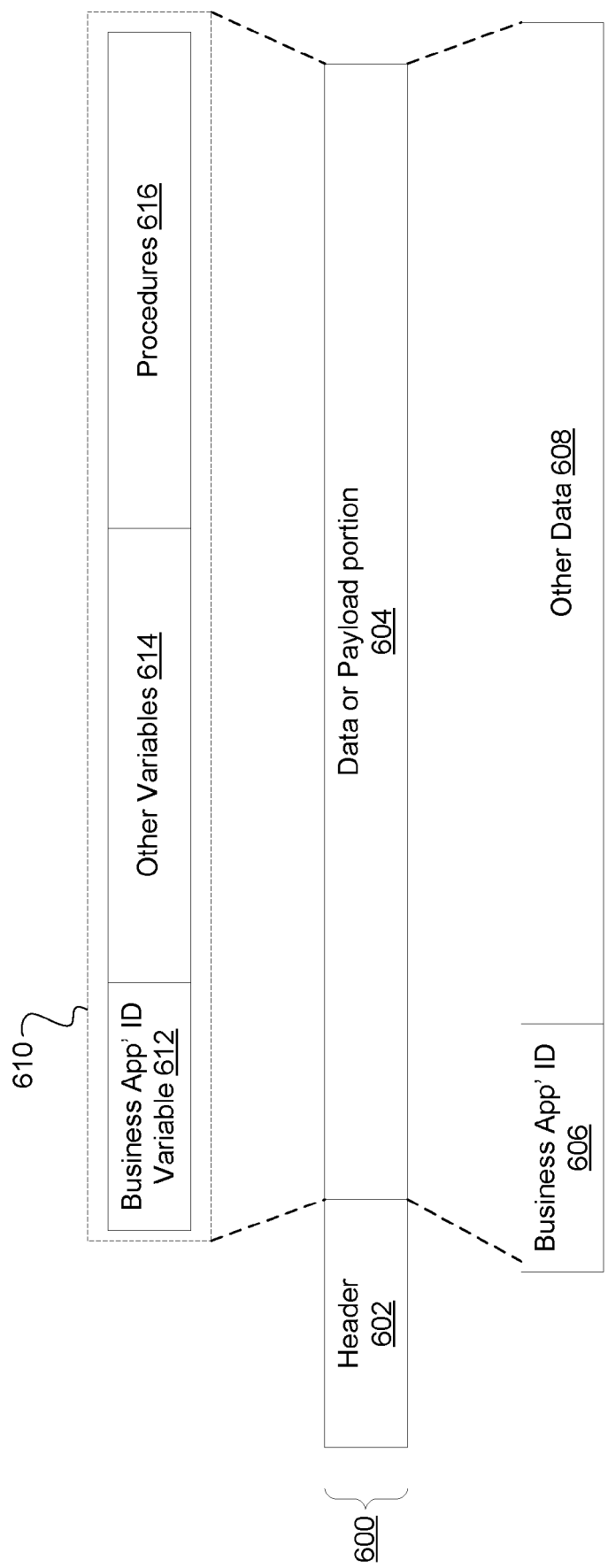
FIG. 6 is a block diagram of example embodiments of a message in accordance with the disclosed subject matter.

FIG. 6 is a block diagram of example embodiments of a message 600 in accordance with the disclosed subject matter. In one embodiment, the message 600 may be an embodiment of the message 552 of FIG. 5, as described above. In another embodiment, the message 600 may be an embodiment of some or all of the messages illustrated by FIGS. 3 and 4, although not specifically discussed at the time. In yet another embodiment, the message 600 may be an embodiment of the messages 252 and 254 of FIG. 2, as described above.

In one embodiment, the message 600 may include a header portion 602 and a payload or data portion 604. In various embodiments, the header portion 602 may include supplemental information, often, in various embodiments, used to route the message along or through a network. In some embodiments, the payload or data portion 604 may include the information transmitted or contained in the message. FIG. 6 illustrates two embodiments of the data portion 604; although, it is understood that the below are merely a few illustrative examples to which the disclosed subject matter is not limited.

In one embodiment, the data portion 604 may include a business application ID portion 606 and a portion including other data 608 as desired or dictated by the CCP or web service. In such an embodiment, the business application ID portion 606 may include the business application ID of the business application (e.g., consumer application or provider application) transmitting the message 600.

In another embodiment, the data portion 604 may include a serialized object 610. In various embodiments, the serialized object 610 may include bit pattern representing a software object or grouped memory storage portion that includes variables and/or procedures including machine executable instructions. In various embodiments, upon receipt of the serialized object 610 the receiving machine may load the bit pattern into memory and access the variable values and execute the procedures. In various embodiments, members are also referred to as properties or members. In some embodiments, procedures are also referred to as methods or functions.

In one embodiment, the serialized object 610 may include a business application ID variable 612 configured to hold a value representing the business application ID of the transmitting business application (e.g., consumer application or provider application). In some embodiments, this variable 612 may be accessible by a procedure stored in the procedure portion 616. In such an embodiment, the serialized object 610 may include other variables portion 614 and/or a procedure portion 616 configured to store the respective bit patterns representing the portions of the object that has been serialized.

FIG. 7 is a flowchart of an example embodiment of a technique 700 in accordance with the disclosed subject matter. In various embodiments, the technique 700 may be used or produced by the systems such as those of FIGS. 1, 2, 3, 4, or even 5. In some embodiments, the technique 700 may make use of or employ messages such as those of FIG. 6. Although, it is understood that the above are merely a few illustrative examples to which the disclosed subject matter is not limited.

Block 702 illustrates that, in one embodiment, the consumer application may be associated with a plurality of provider applications, as described above. In various embodiments, each provider application may be configured to provide a business application, as described above. In various embodiments, the action(s) described by this Block may be performed by the registry 290 of FIG. 2, the consumer application 202 of FIGS. 2, 3, 4, and 5, or the logic port address mapping 205 of FIGS. 3, 4, and 5, as described above.

Block 704 illustrates that, in one embodiment, a business application may be selected with which to communicate, as described above. In various embodiments, the business application may be selected based upon the logical function being performed at the moment, as described above. In various embodiments, the action(s) described by this Block may be performed by the consumer application 202 of FIGS. 2, 3, 4, and 5, or the business logic functions 212 of FIGS. 2, 3, 4, and 5, as described above.

Block 706 illustrates that, in one embodiment, a provider application may be identified that is associated with a consumer application, from amongst a plurality of provider applications hosted on a provider machine, as described above. In various embodiments, identifying may include receiving a business application ID from a registry, as described above. In various embodiments, the business application ID may substantially uniquely identifies the provider application, as described above.

In various embodiments, indentifying may include grouping a plurality of consumer communication proxies into a consumer service group, as described above. In some embodiments, indentifying may include associating the consumer service group with at least one business application ID of a provider application, as described above. In various embodiments, indentifying may include identifying a logical port address of the provider application that includes the business application ID associated with the consumer service group.

In some embodiments, identifying may include selecting a business application with which to communicate, wherein the business application is associated with a business application identifier, as described above. In various embodiments, identifying may include acquiring a set of provider applications with which the consumer application is associated, as described above. In one embodiment, identifying may include determining which of the provider applications, included in the set of provider applications, includes the business application ID of the selected business application, as described above. In some embodiments, identifying may include selecting one of the web services of the determined provider application with which to communicate, as described above.

In some embodiments, identifying may include identifying a provider application based upon the business application provided by the provider application, as described above. In various embodiments, the action(s) described by this Block may be performed by the consumer application 202 of FIGS. 2, 3, 4, and 5, or the consumer communications proxy 206 of FIGS. 2, 3, 4, and 5, as described above.

Block 708 illustrates that, in one embodiment, a message may be transmitted to one of the web services of the identified provider application, as described above. In various embodiments, transmitting may include asynchronously transmitting a message to one of the web services of the identified provider application, as described above.

In another embodiment, transmitting may include providing a consumer communication proxy with a provided message and a logical port address for the web service, as described above. In some embodiments, transmitting may include converting, by the consumer communication proxy, the provided message from a first format to a second format, as described above. In one embodiment, transmitting may include transmitting, by the communication proxy, the provided message to the logical port address of the web service, as described above. In various embodiments, the action(s) described by this Block may be performed by the consumer application 202 of FIGS. 2, 3, 4, and 5, or the consumer communications proxy 206 of FIGS. 2, 3, 4, and 5, as described above.

Block 710 illustrates that, in one embodiment, the consumer application may include a business application ID that substantially uniquely identifies the consumer application, as described above. In such an embodiment, transmitting may include transmitting an unsolicited message to a provider application, wherein the unsolicited message includes the business application ID of the consumer application, as described above. In various embodiments, the action(s) described by this Block may be performed by the consumer application 202 of FIGS. 2, 3, 4, and 5, or the consumer communications proxy 206 of FIGS. 2, 3, 4, and 5, as described above.

Figure 8:
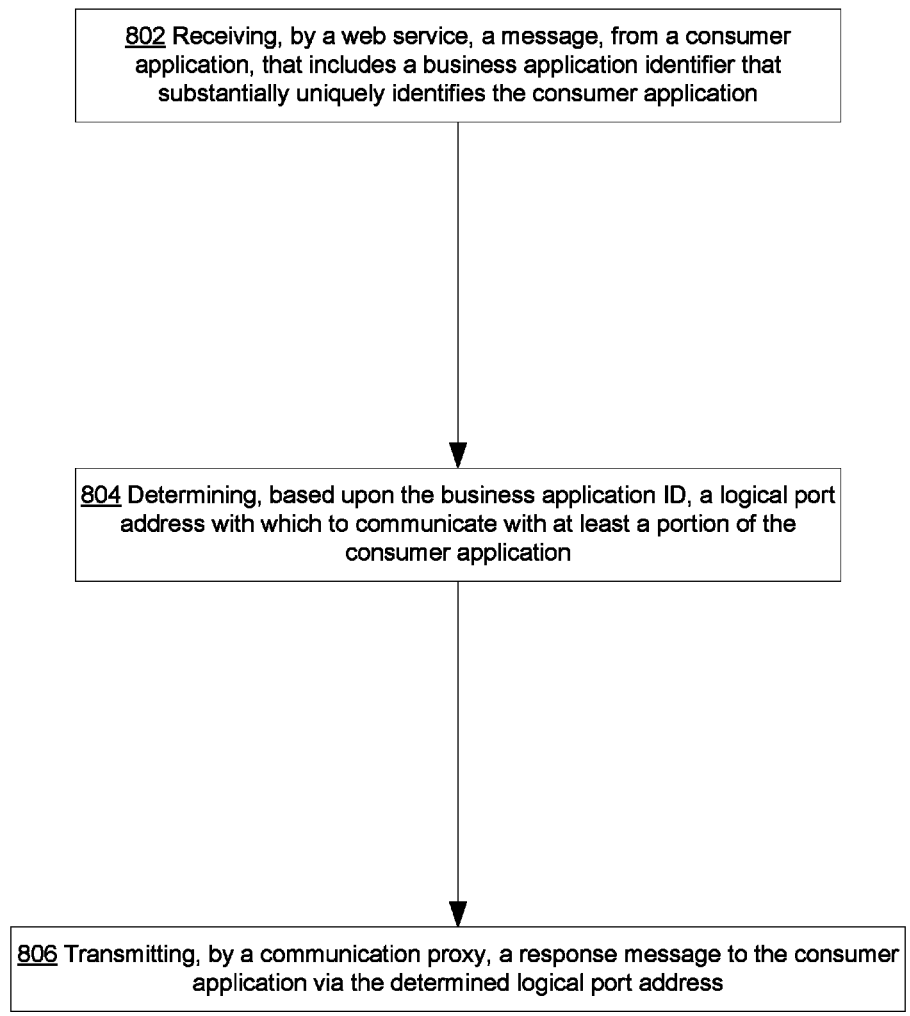
FIG. 8 is a flowchart of an example embodiment of a technique in accordance with the disclosed subject matter.

FIG. 8 is a flowchart of an example embodiment of a technique 800 in accordance with the disclosed subject matter. In various embodiments, the technique 800 may be used or produced by the systems such as those of FIGS. 1, 2, 3, 4, or even 5. In some embodiments, the technique 800 may make use of or employ messages such as those of FIG. 6. Although, it is understood that the above are merely a few illustrative examples to which the disclosed subject matter is not limited.

Block 802 illustrates that, in one embodiment, a message, from a consumer application, may be received, by a web service, which includes a business application identifier that substantially uniquely identifies the consumer application, as described above. In various embodiments, receiving may include receiving an unsolicited message including at least one serialized object, as described above. In some embodiments, receiving may include receiving a message that includes the business application identifier as a portion of the data payload of the message, as described above. In various embodiments, the action(s) described by this Block may be performed by the provider application 222 of FIGS. 2, 3, 4, and 5, or the web service 226 of FIGS. 2, 3, 4, and 5, as described above.

Block 804 illustrates that, in one embodiment, a logical port address may be determined, based upon the business application ID, with which to communicate with at least a portion of the consumer application, as described above. In various embodiments, the logical port address may include a network address of and security information regarding a web service that is included by the consumer application, and configured to communicate with a communications proxy included by the receiving provider application, as described above.

In some embodiments, determining may include receiving, from a registry during a configuration period, a plurality of associations between business application IDs and respective logical port addresses, as described above. In various embodiments, determining may include matching the business application ID included in the received message with one of the business application IDs received by the registry, as described above. In one embodiment, determining may include identifying a logical port address that is associated with matched business application ID and the communications proxy, as described above. In various embodiments, the action(s) described by this Block may be performed by the provider application 222 of FIGS. 2, 3, 4, and 5, or the communications proxy 229 or 229b of FIG. 5, as described above.

Block 806 illustrates that, in one embodiment, a response message may be transmitted to the consumer application via the determined logical port address, as described above. In various embodiments, transmitting may include transmitting the response via a communications proxy included by the provider application, as described above. In various embodiments, the action(s) described by this Block may be performed by the provider application 222 of FIGS. 2, 3, 4, and 5, or the communications proxy 229 or 229b of FIG. 5, as described above.

Figure 9:
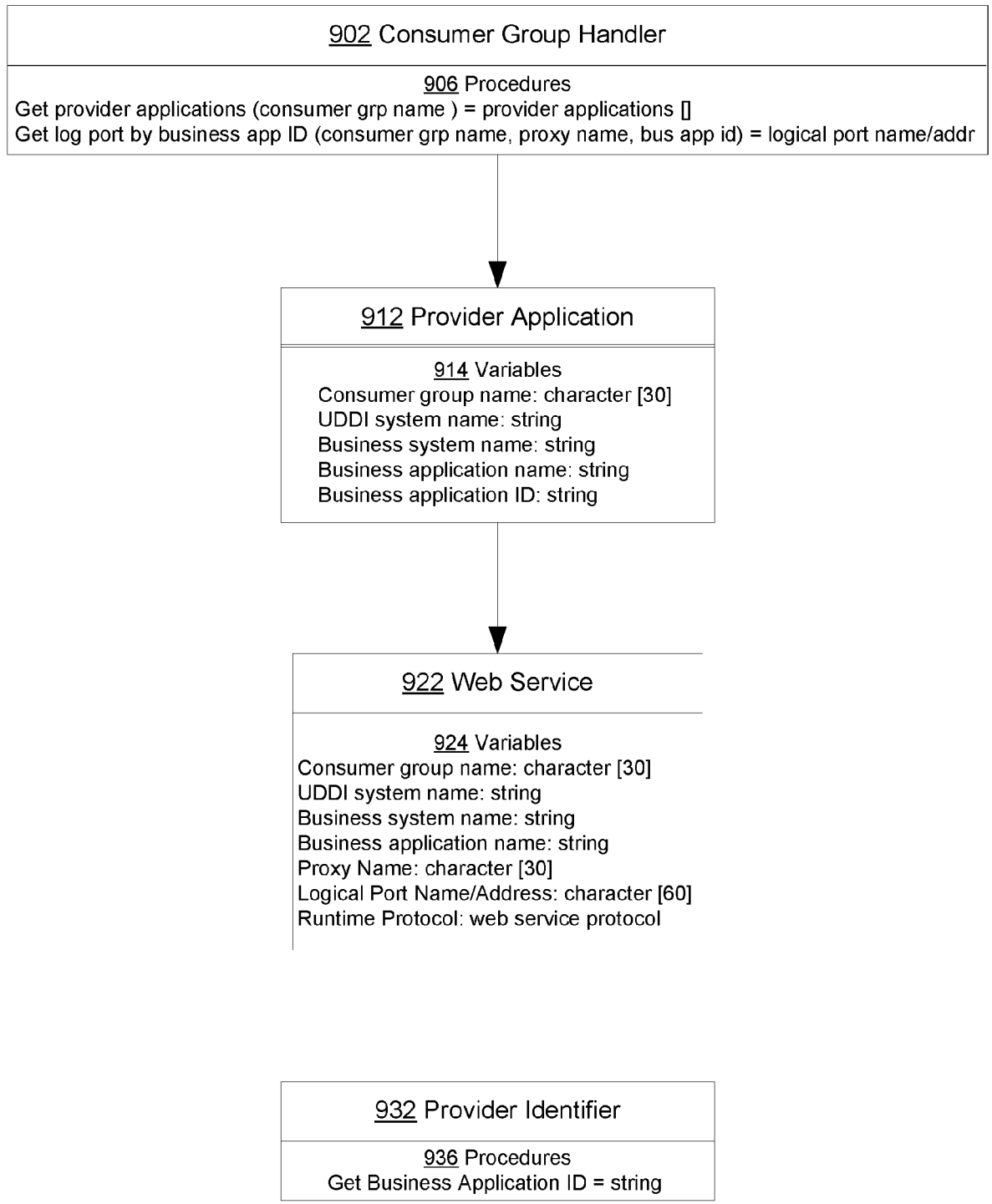
FIG. 9 is a block diagram of example embodiments of an application programming interface in accordance with the disclosed subject matter.

FIG. 9 is a block diagram of example embodiments of an application programming interface (API) 900 in accordance with the disclosed subject matter. In various embodiments, an API may include a standardized set of variables and/or functions, procedures, methods, classes or protocols that an operating system, library or service provides to support requests made by various computer programs or applications. In some embodiments, these variables, procedures or classes may be instantiated within a computing system (e.g., a consumer machine, provider machine, etc.) or an application (e.g., a consumer application, provider application, etc.).

In one embodiment, the API 900 may include two portions. A first portion for use or to be employed for communication similar to that described in FIGS. 3, 4 and 5. In such an embodiment, that the consumer application may choose the provider application and it's logical port where a message is to be sent, as described above. In FIG. 5 while the consumer application 202 may employ this API when transmitting message 552, the API may also be employed by the provider application 222 when transmitting message 554, as described above. And, a second portion for use or to be employed for communication similar to that described in FIG. 5. In such an embodiment, the API may be employed in order to transfer the business application ID of the consumer application in the payload of message 552 so that the provider application will know to whom it has to send back the response message, as described above. Although, it is understood that the above are merely a few illustrative examples to which the disclosed subject matter is not limited.

In various embodiments, the first communications case or scheme may make use of a consumer group handler class 902, a provider application class 912, and a web service class 922. In such an embodiment, these classes 902, 912, and 922 may be employed to determine or identify a logical port address of a web service associated with a communications proxy, as described above.

In some embodiments, the consumer group handler class 902 may be configured to provide either a list of provider applications associated with a consumer group and/or a logical port name or address. In one embodiment, the consumer group handler class 902 may include at least two publically available methods 906. In one embodiment, the method named "get provider applications" may be configured to take a consumer group name (e.g., the name of consumer group 210 of FIG. 3) as input and return or provide a list, array, or collection of provider applications associated with that consumer group. In some embodiments, this method or a similar such method may be used to identify which business application should be used to fulfill a particular business function, as described above.

In various embodiments, the method named "Get logical port by business application ID" may be configured to take a consumer group name, a communications proxy name (e.g., the name of CCP 206 of FIG. 3), and the business application ID of the target provider application (e.g., business application ID 224 of provider application 222 of FIG. 3) and return the logical port address or name of the appropriate web service (e.g., web service 226) with whom the CCP should communicate. In some embodiments, this method or a similar such method may be used or employed to determine a logical port address, as described above.

In some embodiments, the provider application class 912 may be configured to hold or group information related to an actual provider application (e.g., provider application 222 of FIG. 3). In various embodiments, the provider application class 912 may be instantiated or created in memory on a consumer machine or application. In one embodiment, the provider application class 912 may be employed when identifying an actual provider application (e.g., provider application 222 of FIG. 3) by its business application ID, as described above.

In various embodiments, the provider application class 912 may include a plurality of publically available variables or properties 914. In one embodiment, the provider application class 912 may include a variable named "consumer group name" that identifies or names the consumer group with which this provider application class 912 is associated. In another embodiment, the provider application class 912 may include a variable named "UDDI system name" configured to identify the Universal Description Discovery and Integration (UDDI) registry or service registry (e.g. service registry 290 of FIG. 2) containing or managing information regarding the represented actual provider application. In another embodiment, the provider application class 912 may include a variables named "business system name" and/or "business application name" configured to identify the business application and functions provided by the represented actual provider application (e.g., "CRM v1.0", "NetWeaver 2.0", etc.). In one embodiment, the provider application class 912 may include a variable named "business application ID" configured to substantially uniquely identify the represented actual provider application, as described above. It is noted that while, in various embodiments, the business application ID may be substantially unique, the business application name may include a human-readable description of the business application that may occur multiple times within the system as multiple copies or instantiations of the business application are created. As such, attempts to identify an application based upon its name may return many provider applications, while an attempt to identify an application based upon its ID should return only one provider application.

In some embodiments, the web service class 922 may be configured to hold or group information related to an actual web service (e.g., web service 226 of FIG. 3). In various embodiments, the web service class 922 may be instantiated or created in memory on a consumer machine or application. In one embodiment, the web service class 922 may be employed when determining the logical port address with which to communicate with a web service (e.g., web service 226 of FIG. 3) or a provider application (e.g., provider application 222 of FIG. 3), as described above.

In various embodiments, the web service class 922 may include a plurality of publically available variables or properties 924. In one embodiment, the web service class 922 may include a variable named "consumer group name", as described above. In another embodiment, the web service class 922 may include a variable named "UDDI system name", as described above. In another embodiment, the web service class 922 may include variables named "business system name" and "business application name", as described above. In another embodiment, the web service class 922 may include a variable named "proxy name" configured to identify the communications proxy associated with the web service. In various embodiments, this variable may be used to identify which web service a communications proxy is configured to communicate with, as described above. In another embodiment, the web service class 922 may include a variable named "logical port name" or "logical port address" configured to store the logical port address associated with the represented web service, as described above. In some embodiments, the web service class 922 may include a variable named "runtime protocol" configured to store or identify the communications protocol employed by the represented web service. In various embodiments, this information may be stored as part of the logical port name.

In various embodiments, the second communications case or scheme (illustrated by FIG. 5) may make use of a provider identifier class 932. In such an embodiment, this class 932 may be employed to determine or identify a business application ID of a consumer application (e.g., consumer application 202 of FIG. 5) prior to embedding the business application ID into message (e.g., message 552 of FIG. 5). In another embodiment, an instantiation of the class 932 may be embedded into the message and then used or employed by the receiving provider application to determine the business application ID of the consumer application.

In one embodiment, the provider identifier class 932 may include at least one publicly accessible method 936. In various embodiments, this method 936 may be named "get business application ID" and configured to return the business application ID of the consumer application or business application which first instantiated the class 932.

It is understood that the above names and identifiers are merely a few illustrative examples to which the disclosed subject matter is not limited. In various other embodiments, the API 900 may include differently named classes, variables and/or methods. Likewise, in various embodiments, the number of variables and/or methods may be changed without alerting the underlying function of facilitating a programmatic interface for determining the business application ID, and logical port address of a business application to further the communication scenarios illustrated by FIGS. 2, 3, 4, and/or 5 and other scenarios within the scope of the disclosed subject matter.

Figure 1:
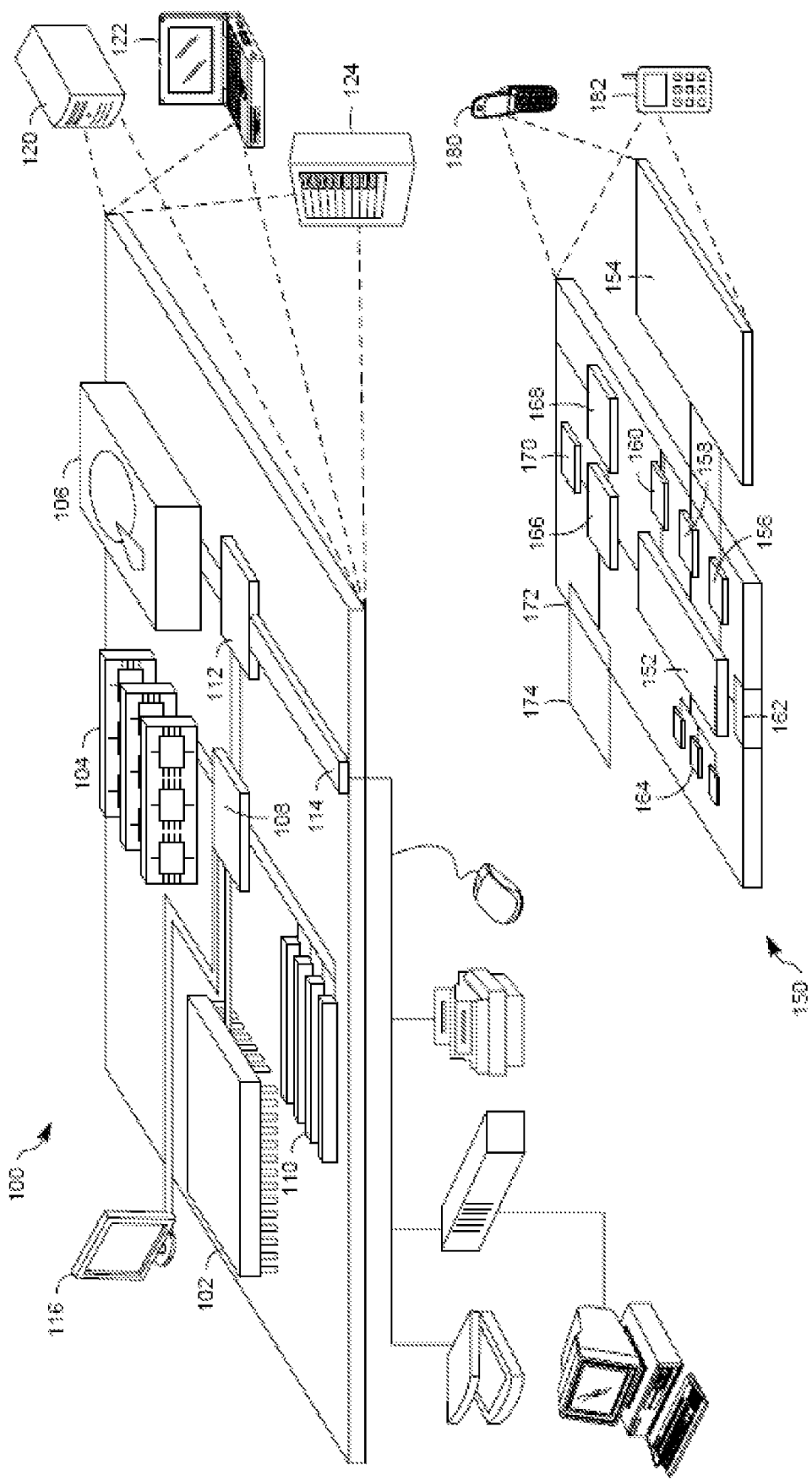
FIG. 1 is a block diagram of example embodiments of systems in accordance with the disclosed subject matter.

FIG. 1 shows an example of a generic computer device 100 and a generic mobile computer device 150, which may be used with the techniques described here. Computing device 100 is intended to represent various forms of digital computers, such as laptops, desktops, workstations, personal digital assistants, servers, blade servers, mainframes, and other appropriate computers. Computing device 150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 100 includes a processor 102, memory 104, a storage device 106, a high-speed interface 108 connecting to memory 104 and high-speed expansion ports 110, and a low speed interface 112 connecting to low speed bus 114 and storage device 106. Each of the components 102, 104, 106, 108, 110, and 112, are interconnected using various busses, and may be mounted on a common motherboard or in other manners as appropriate. The processor 102 can process instructions for execution within the computing device 100, including instructions stored in the memory 104 or on the storage device 106 to display graphical information for a graphical user interface (GUI) on an external input/output device, such as display 116 coupled to high speed interface 108. In other implementations, multiple processors and/or multiple buses may be used, as appropriate, along with multiple memories and types of memory. Also, multiple computing devices 100 may be connected, with each device providing portions of the necessary operations (e.g., as a server bank, a group of blade servers, or a multi-processor system, etc.).

The memory 104 stores information within the computing device 100. In one implementation, the memory 104 includes a volatile memory unit or units. In another implementation, the memory 104 includes a non-volatile memory unit or units. The memory 104 may also be another form of computer-readable medium, such as a magnetic or optical disk.

The storage device 106 is capable of providing mass storage for the computing device 100. In one implementation, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

The high speed controller 108 manages bandwidth-intensive operations for the computing device 100, while the low speed controller 112 manages lower bandwidth-intensive operations. Such allocation of functions is exemplary only. In one implementation, the high-speed controller 108 is coupled to memory 104, display 116 (e.g., through a graphics processor or accelerator), and to high-speed expansion ports 110, which may accept various expansion cards (not shown). In the implementation, low-speed controller 112 is coupled to storage device 106 and low-speed expansion port 114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 100 may be implemented in a number of different forms, as shown in the figure. For example, it may be implemented as a standard server 120, or multiple times in a group of such servers. It may also be implemented as part of a rack server system 124. In addition, it may be implemented in a personal computer such as a laptop computer 122. Alternatively, components from computing device 100 may be combined with other components in a mobile device (not shown), such as device 150. Each of such devices may contain one or more of computing device 100, 150, and an entire system may be made up of multiple computing devices 100, 150 communicating with each other.

Computing device 150 includes a processor 152, memory 164, an input/output (I/O) device such as a display 154, a communication interface 166, and a transceiver 168, among other components. The device 150 may also be provided with a storage device, such as a micro-drive or other device, to provide additional storage. Each of the components 150, 152, 164, 154, 166, and 168, are interconnected using various buses, and several of the components may be mounted on a common motherboard or in other manners as appropriate.

The processor 152 can execute instructions within the computing device 150, including instructions stored in the memory 164. The processor may be implemented as a chipset of chips that include separate and multiple analog and digital processors. The processor may provide, for example, for coordination of the other components of the device 150, such as control of user interfaces, applications run by device 150, and wireless communication by device 150.

Processor 152 may communicate with a user through control interface 158 and display interface 156 coupled to a display 154. The display 154 may be, for example, a TFT LCD (Thin-Film-Transistor Liquid Crystal Display) or an OLED (Organic Light Emitting Diode) display, or other appropriate display technology. The display interface 156 may comprise appropriate circuitry for driving the display 154 to present graphical and other information to a user. The control interface 158 may receive commands from a user and convert them for submission to the processor 152. In addition, an external interface 162 may be provide in communication with processor 152, so as to enable near area communication of device 150 with other devices. External interface 162 may provide, for example, for wired communication in some implementations, or for wireless communication in other implementations, and multiple interfaces may also be used.

The memory 164 stores information within the computing device 150. The memory 164 can be implemented as one or more of a computer-readable medium or media, a volatile memory unit or units, or a non-volatile memory unit or units. Expansion memory 174 may also be provided and connected to device 150 through expansion interface 172, which may include, for example, a SIMM (Single In Line Memory Module) card interface. Such expansion memory 174 may provide extra storage space for device 150, or may also store applications or other information for device 150. Specifically, expansion memory 174 may include instructions to carry out or supplement the processes described above, and may include secure information also. Thus, for example, expansion memory 174 may be provide as a security module for device 150, and may be programmed with instructions that permit secure use of device 150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 164, expansion memory 174, or memory on processor 152, that may be received, for example, over transceiver 168 or external interface 162.

Device 150 may communicate wirelessly through communication interface 166, which may include digital signal processing circuitry where necessary. Communication interface 166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 168. In addition, short-range communication may occur, such as using a Bluetooth, WiFi, or other such transceiver (not shown). In addition, GPS (Global Positioning System) receiver module 170 may provide additional navigation- and location-related wireless data to device 150, which may be used as appropriate by applications running on device 150.

Device 150 may also communicate audibly using audio codec 160, which may receive spoken information from a user and convert it to usable digital information. Audio codec 160 may likewise generate audible sound for a user, such as through a speaker, e.g., in a handset of device 150. Such sound may include sound from voice telephone calls, may include recorded sound (e.g., voice messages, music files, etc.) and may also include sound generated by applications operating on device 150.

The computing device 150 may be implemented in a number of different forms, as shown in the figure. For example, it may be implemented as a cellular telephone 180. It may also be implemented as part of a smart phone 182, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosed subject matter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer implemented method comprising:
   transmitting a request message, from a consumer machine to a service registry remote from the consumer machine, the request message including a business application identifier (ID) that substantially uniquely identifies a consumer application executed by the consumer machine, the request message requesting identification of one or more provider applications associated with the consumer application among a plurality of provider applications hosted on a provider machine remote from the consumer machine and the service registry, each provider application including at least one web service;

receiving, by the consumer machine from the service registry, at least one provider application's business ID associated with the business application ID of the consumer application in response to the request message;

identifying, by the consumer machine and based at least in part upon the received provider application's business application ID, a provider application that is associated with the consumer application, from amongst the plurality of provider applications;

determining, by the consumer machine, a logical port address of a web service provided by the identified provider application using mapping information, the mapping information including a list of provider applications' business IDs, and, for each provider application's business ID, one or more web services and corresponding logical port addresses associated with a respective provider application, wherein the determining includes selecting the provider application whose provider application's business ID matches the received provider application's business ID and selecting the logical port address for the web service associated with the selected provider application; and transmitting a message to the web service of the selected provider application using the logical port address.

2. The method of claim 1 wherein identifying includes:
grouping a plurality of consumer communication proxies into a consumer service group;
associating the consumer service group with the provider application's business ID; and
identifying the logical port address that includes the provider application's business ID associated with the consumer service group using the mapping information.

3. The method of claim 1 wherein transmitting includes:
providing a consumer communication proxy with the message and the logical port address for the selected web service;
converting, by the consumer communication proxy, the message from a first format associated with the consumer application to a second format associated with the selected web service; and
transmitting, by the communication proxy, the message to the logical port address of the selected web service.

4. The method of claim 1 wherein transmitting includes asynchronously transmitting the message to the selected web service of the identified provider application.

5. The method of claim 1 wherein identifying includes:
selecting a provider application with which to communicate based on the type of business logic to be performed;
acquiring a set of provider applications and corresponding provider applications' business IDs with which the consumer application is associated;
determining which provider application, included in the set of provider applications, includes the provider application's business ID of the selected provider application; and
selecting a web service of the determined provider application with which to communicate based on the mapping information.

6. The method of claim 1, wherein the service registry is centrally located with an Enterprise Service Architecture (ESA) landscape.

7. The method of claim 1, further comprising:
registering the provider application with the service registry including transmitting a registration message having the provider application's business ID and at least one web service description language (WSDL) message defining a web service provided by the provider application.

8. The method of claim 1, wherein the plurality of provider applications includes a supplier relationship management (SRM) application, a product lifecycle management (PLM) application, and a supply chain management (SCM) application, and the selected provider application is one of the SRM application, the PLM application, and the SCM application.

9. The method of claim 1, wherein the plurality of provider applications includes a first provider application and a second provider application executing on a same provider machine, and the first provider application and the second provider application include substantially equivalent web services, and the selected provider application includes one of the first provider application and the second provider application.

10. An apparatus comprising:
at least one business logic function configured to perform logical operations on business data; and
at least one consumer communication proxy configured to:
transmit a request message, to a service registry remote from the apparatus, the request message including a business application identifier (ID) that substantially uniquely identifies the at least one business logic function, the request message requesting identification of one or more provider applications associated with the at least one business logic function among a plurality of provider applications hosted on a provider machine remote from the apparatus and the service registry, each provider application including at least one web service,
receive, from the service registry, at least one provider application's business application identifier (ID) that is associated with the business application ID in response to the request message,
identify, based at least upon the provider application's business application ID, a provider application from amongst the plurality of provider applications,
determine a logical port address of a web service provided by the identified provider application using mapping information, the mapping information including a list of provider applications' business IDs, and, for each provider application's business ID, one or more web services and corresponding logical port addresses associated with a respective provider application, including selecting the provider application whose provider application's business ID matches the received provider application's business ID and selecting the logical port address for the web service associated with the selected provider application, and
transmit a message to the web service of the selected provider application using the logical port address.

11. The apparatus of claim 10,
wherein the apparatus includes a plurality of consumer communication proxies,
wherein the apparatus is configured to group a plurality of consumer communication proxies into a consumer service group, and associate the consumer service group with the provider application's business application ID.

12. The apparatus of claim 10, wherein the consumer communication proxy is configured to convert the message from a first format associated with the at least one business logic function to a second format associated with the selected web service, and transmit the message to the logical port address of the selected web service.

13. A computer program product, comprising a non-transitory computer-readable medium having executable instructions by at least one processor, the executable instructions configured to:
- transmit a request message, from a consumer machine to a service registry remote from the consumer machine, the request message including a business application identifier (ID) that substantially uniquely identifies a consumer application executed by the consumer machine, the request message requesting identification of one or more provider applications associated with the consumer application among a plurality of provider applications hosted on a provider machine remote from the consumer machine and the service registry, each provider application including at least one web service;
- receive, by the consumer machine from the service registry, at least one provider application's business ID associated with the business application ID of the consumer application in response to the request message;
- identify, by the consumer machine and based at least in part upon the received provider application's business application ID, a provider application that is associated with the consumer application, from amongst the plurality of provider applications;
- determine, by the consumer machine, a logical port address of a web service provided by the identified provider application using mapping information, the mapping information including a list of provider applications' business IDs, and, for each provider application's business ID, one or more web services and corresponding logical port addresses associated with a respective provider application, wherein the determine includes selecting the provider application whose provider application's business ID matches the received provider application's business ID and selecting the logical port address for the web service associated with the selected provider application; and
- transmit a message to the web service of the selected provider application using the logical port address.

14. The computer program product of claim 13, wherein the executable instructions includes instructions to:
- group a plurality of consumer communication proxies into a consumer service group;
- associate the consumer service group with the provider application's business ID; and
- identify the logical port address that includes the provider application's business ID associated with the consumer service group using the mapping information.

15. The computer program product of claim 13, wherein the executable instructions to transmit include:
- provide a consumer communication proxy with the message and the logical port address for the selected web service;
- convert the message from a first format associated with the consumer application to a second format associated with the selected web service; and
- transmit the message to the logical port address of the selected web service.

16. The computer program product of claim 13, wherein the executable instructions to transmit include asynchronously transmitting the message to the selected web service of the identified provider application.

17. The computer program product of claim 13, wherein the executable instructions to identify include:
- select a provider application with which to communicate based on the type of business logic to be performed;
- acquire a set of provider applications and corresponding provider applications' business IDs with which the consumer application is associated;
- determine which provider application, included in the set of provider applications, includes the provider application's business ID of the selected provider application; and
- select a web service of the determined provider application with which to communicate based on the mapping information.

* * * * *